United States Patent
Francois et al.

(10) Patent No.: US 10,037,426 B2
(45) Date of Patent: Jul. 31, 2018

(54) METHOD OF LOADING FILES INTO RANDOM ACCESS MEMORY IN AN ELECTRONIC DEVICE AND ASSOCIATED ELECTRONIC DEVICE

(71) Applicant: Oberthur Technologies, Colombes (FR)

(72) Inventors: Axel Francois, Colombes (FR); Michele Sartori, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 57 days.

(21) Appl. No.: 14/932,347

(22) Filed: Nov. 4, 2015

(65) Prior Publication Data

US 2016/0125186 A1    May 5, 2016

(30) Foreign Application Priority Data

Nov. 5, 2014   (FR) ...................... 14 60679

(51) Int. Cl.
  *G06F 21/00*  (2013.01)
  *G06F 21/57*  (2013.01)
  *G06F 21/62*  (2013.01)
  *G06F 21/74*  (2013.01)

(52) U.S. Cl.
  CPC .......... *G06F 21/57* (2013.01); *G06F 21/6218* (2013.01); *G06F 21/74* (2013.01); *G06F 2221/034* (2013.01)

(58) Field of Classification Search
  CPC .......... G06F 21/50; G06F 21/51; G06F 21/52; G06F 21/53; G06F 21/44; G06F 21/57
  See application file for complete search history.

(56) References Cited

U.S. PATENT DOCUMENTS

2010/0031325 A1* 2/2010 Maigne ............... G06F 9/45533
                                                                    726/4
2014/0250290 A1* 9/2014 Stahl .................... G06F 21/575
                                                                    713/2

FOREIGN PATENT DOCUMENTS

WO    2012-058364      5/2012
WO    2013/174503 A1   11/2013

OTHER PUBLICATIONS

FR Search Report, dated Jun. 18, 2015; Application No. 1460679.

(Continued)

*Primary Examiner* — Edward Zee
(74) *Attorney, Agent, or Firm* — Young & Thompson

(57) ABSTRACT

In an electronic device designed to function in a trusted execution environment (TEE), because of the execution of a trusted operating system by a processor of the electronic device, or in a rich execution environment (REE), a method of loading files into random access memory includes the following steps:
  reception (E10) by the trusted operating system of information (L1) identifying at least one file;
  verification (E11) by the trusted operating system of the conformance of the identified file to at least one given criterion;
  in the event of conformance, loading (E13) the identified file into an area (Z2) of random access memory accessible in read only mode when functioning in the rich execution environment (REE).
An associated electronic device is also proposed.

13 Claims, 2 Drawing Sheets

(56) References Cited

OTHER PUBLICATIONS

ARM Limited: "ARM Security Technology Building a Secure System using TrustZone Technology", Internet Citation, Apr. 30, 2009, pp. I-XII,1, URL:http://infocenter.arm.com/help/topic/com.arm.doc.prd29-genc-009492c/PRD29-GENC-009492C_trustzone_security_whitepaper.pdf.

Ekberg et al., "The Untapped Potential of Trusted Execution Environments on Mobile Devices," pp. 1-12, URL:https://wiki.helsinki.fi/download/attachments/117218151/SP-2013-06-0097.R1_Kostiainen.pdf.

Li et al., "DroidVault: A Trusted Data Vault for Android Devices," 2014 19th International Conference on Engineering of Complex Computer Systems, pp. 29-38.

Roth, "Next generation mobile rootkits, BlackHat EU 2013".

"Rootkits on Your Smartphone," URL:http://resources.infosecinstitute.com/rootkits-on-your-smartphone.

"A software level analysis of TrustZone OS and Trustlets in samsung galaxy phone", Jun. 4, 2013 URL:https://www.sensepost.com/blog/2013/a-software-level-analysis-of-trustzone.

Ekberg, "Trusted Execution Environments on Mobile Devices," ACM CCS 2013 Tutorial, URL:http://www.cs.helsinki.fi/group/secures/CCS-tutorial/tutorial-slides.pdf.

Vahidi, "VETE: Virtualizing the Trusted Execution Environment," Mar. 5, 2013, SICS Technical Report T2013:02, pp. 1-35, URL: http://soda.swedish-ict.se/5456/2/20130305b_VETE_final_report.pdf.

"White Paper Towards a Secure Automotive Platform", Aug. 31, 2009, URL:http://www.secunet.com/fileadmin/user_upload/Download/Printmaterial/englisch/sn_Whitepaper_Secure_Automotive_Platform_E.pdf.

Winter, "Trusted Computing Building Blocks for Embedded Linux-based ARM TrustZone Platforms," Proceedings of the 3rd ACM Workshop on Scalable Trusted Computing, STC '08, Oct. 31, 2008, pp. 21-30.

* cited by examiner

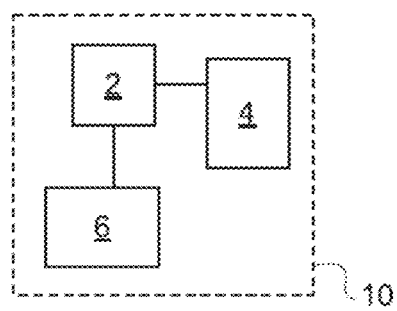
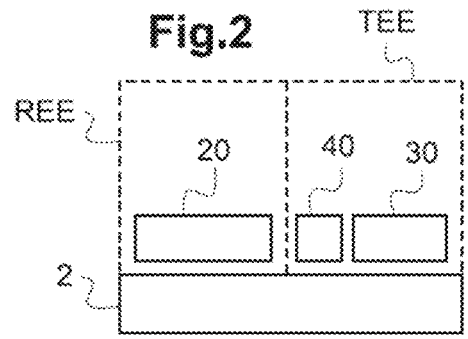
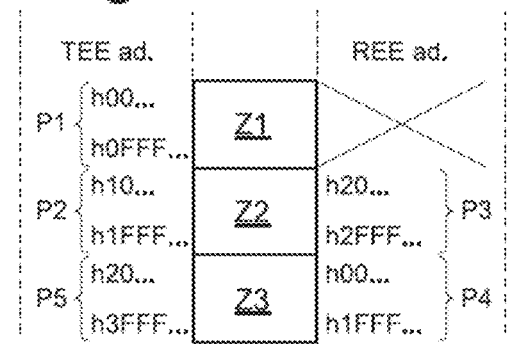
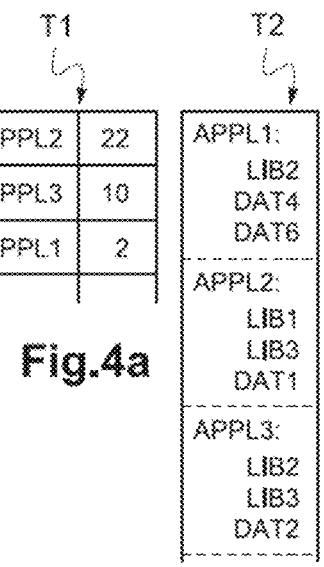
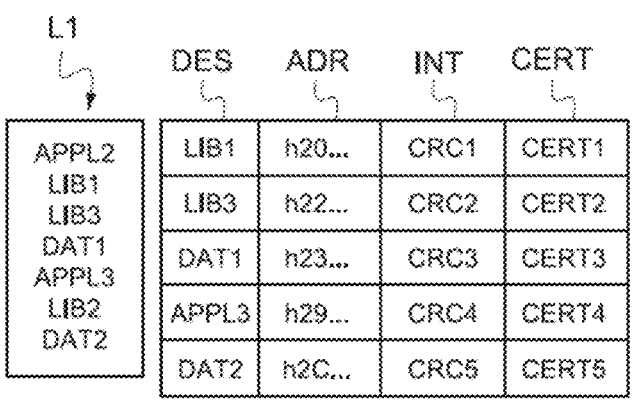
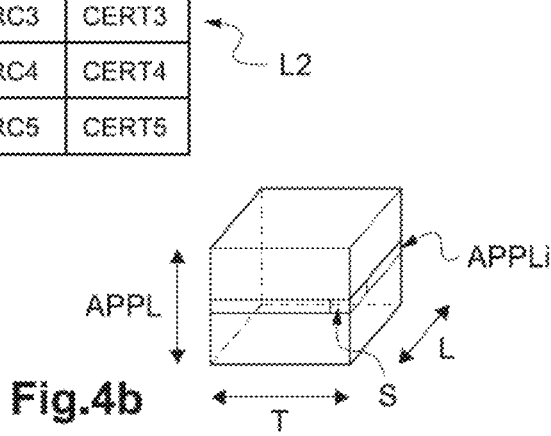

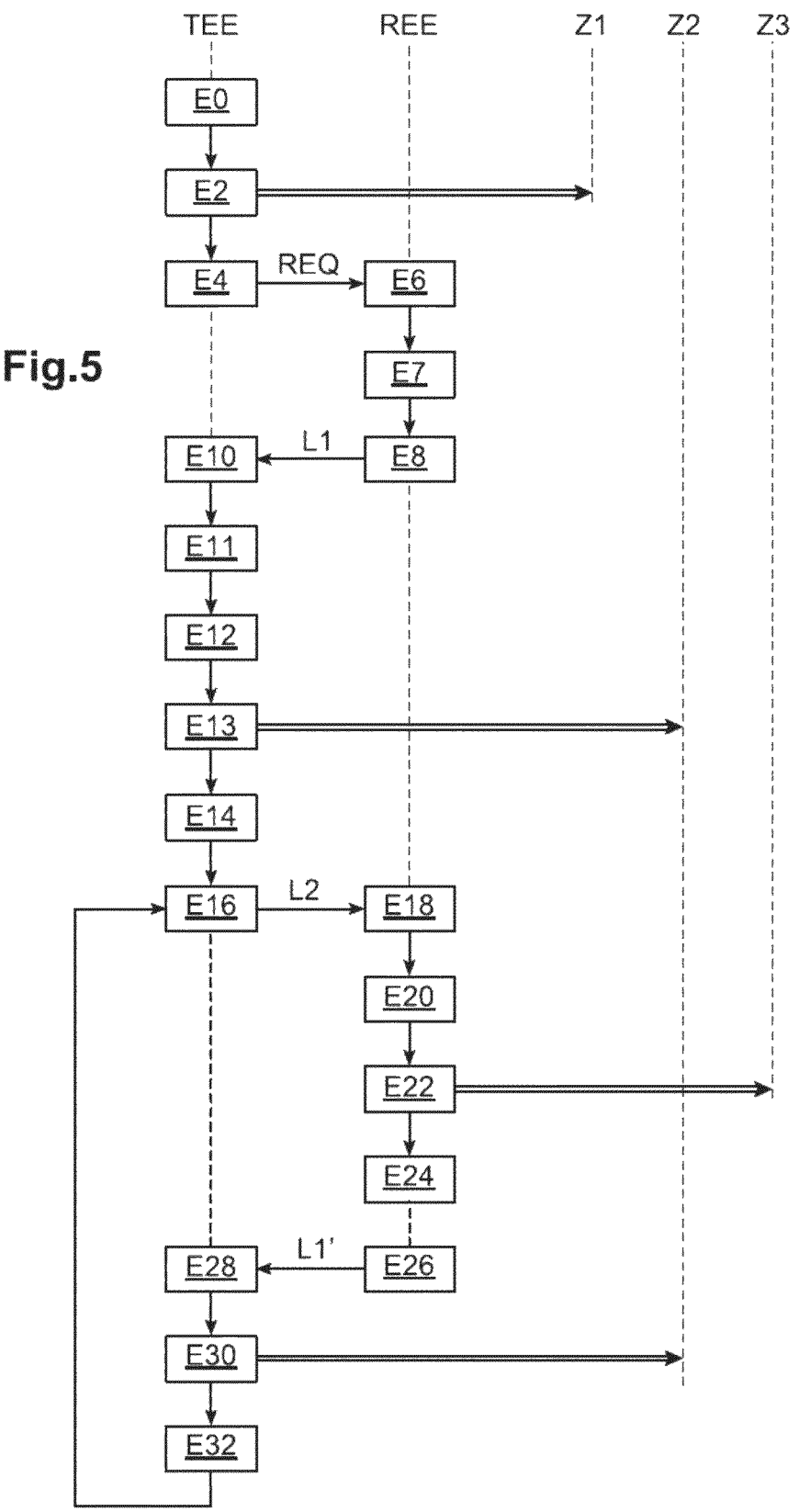

METHOD OF LOADING FILES INTO RANDOM ACCESS MEMORY IN AN ELECTRONIC DEVICE AND ASSOCIATED ELECTRONIC DEVICE

FIELD OF THE INVENTION

The present invention concerns the sharing of files between a trusted execution environment and a rich execution environment.

It more particularly concerns a method of loading files into random access memory in an electronic device designed to function in a trusted execution environment and in a rich execution environment as well as an electronic device of this kind.

The invention applies particularly advantageously when a shared memory area is provided that can be used both by the trusted execution environment and by the rich execution environment.

BACKGROUND OF THE INVENTION

As explained for example in the paper "*The Untapped Potential of Trusted Execution Environments on Mobile Devices*" by J.-E. Ekberg, K. Kostiainen and N. Asokan in IEEE Security & Privacy, volume PP edition 99, 16 Apr. 2014, it is known to make the functioning of electronic devices secure by using a trusted operating system that makes it possible to provide a trusted execution environment (TEE) in which only certain applications can be installed and executed.

Such a trusted environment is generally offered alongside a rich execution environment (REE) in which the security constraints are looser and a greater number of applications can therefore be installed. The rich environment relies on the electronic device executing a rich operating system (Rich OS) distinct from the trusted operating system.

In order to guarantee good isolation between the two execution environments and therefore good functioning security, dedicated memory spaces are generally provided for each execution environment, notably in random access memory.

It has nevertheless been proposed additionally to use a shared memory area accessible by the two execution environments, as mentioned in particular in the presentation "*Next Generation Mobile Rootkits*" by T. Roth, BlackHat Europe 2013 (cited as reference [15] in the paper referred to above).

SUMMARY OF THE INVENTION

In this context, the present invention proposes a method of loading files into random access memory in an electronic device designed to function in a trusted execution environment, because of the execution of a trusted operating system by a processor of the electronic device, or in a rich execution environment, characterized in that it includes the following steps:
 reception by the trusted operating system of information identifying at least one file;
 verification by the trusted operating system of the conformance of the identified file to at least one given criterion;
 in the event of conformance, loading (for example by the trusted operating system) the identified file into an area of random access memory accessible in read only mode when functioning in the rich execution environment.

The trusted operating system therefore controls the loading of files into a random access memory area shared between the trusted execution environment and the rich execution environment; this shared area is accessible in read only mode during functioning in the rich execution environment and the files that are stored there, notably used during functioning in the trusted execution environment, therefore cannot be corrupted by an application executed in the rich execution environment.

This loading method may be executed on starting the electronic device, as described in detail hereinafter, or during functioning, for example on launching in the rich execution environment an application corresponding to the file or using the file.

The identified file is an application, for example, a library or a data set.

In accordance with other optional and therefore non-limiting features:
 the information identifying the file is contained in a description of requirements (for example a list of requirements) prepared during functioning in the rich execution environment;
 the description of requirements is constructed as a function of data representative of frequencies of use of applications installed in the rich execution environment;
 the description of requirements is constructed as a function of use statistics relating to multiple criteria;
 the method includes a step of construction by the trusted operating system of a sharing list including a designation of the loaded file and a storage address of the loaded file (for example a virtual address as indicated hereinafter);
 the sharing list includes integrity verification information associated with the loaded file;
 the sharing list includes a certificate generated by the trusted operating system and relating to the loaded file;
 the sharing list is stored in said random access memory area accessible in read only mode during functioning in the rich execution environment;
 said loading is effected from a non-volatile memory (for example a reprogrammable non-volatile memory);
 said area is accessible in read only mode during functioning in the rich execution environment by means of virtual addresses pointing to physical addresses distinct from the virtual addresses concerned;
 the information identifying the file is received on switching over from the rich execution environment to the trusted execution environment.

The method may further include the following steps, executed in the rich execution environment for each file mentioned in the description of requirements:
 determining if the file mentioned has been loaded into said random access memory area accessible in read only mode;
 if not, loading the file concerned into another random access memory area accessible in write mode during functioning in the rich execution environment.

The proposed method may further include the following steps:
 following installation of a new application in the rich execution environment, transmission to the trusted operating system of an updated description of requirements;
 loading into the area of random access memory accessible in read only mode during functioning in the rich execution environment a new file designated in the updated description of requirements.

The invention also proposes an electronic device including at least one processor and a random access memory and designed to function in a trusted execution environment because of the execution of a trusted operating system by the processor or in a rich execution environment, characterized in that the trusted operating system is designed to receive information identifying at least one file, to verify the conformance of the identified file with at least one given criterion and, in the event of conformance, to load the identified file into a random access memory area accessible in read only mode during functioning in the rich execution environment.

This electronic device may further have one or more of the optional features formulated above in relation to the method.

BRIEF DESCRIPTION OF THE DRAWINGS

The following description with reference to the appended drawings, which are provided by way of non-limiting example, explains clearly in what the invention consists and how it may be reduced to practice.

In the appended drawings:

FIG. 1 represents the principal elements of an electronic device used in the context of the invention;

FIG. 2 represents diagrammatically the use of two execution environments in the electronic device from FIG. 1;

FIG. 3 illustrates the sharing of the random access memory as proposed in the context of the invention;

FIG. 4a represents functional tables stored in the electronic device from FIG. 1 and used in the context of the present invention;

FIG. 4b represents a three-dimensional table for storing use statistics that can be used in a variant embodiment;

FIG. 5 represents an example of a method in accordance with the invention of loading files into random access memory;

FIG. 6 represents functional lists generated during the method from FIG. 5.

DETAILED DESCRIPTION OF THE INVENTION

FIG. 1 represents the principal elements of an electronic device 10 in which the invention is used.

This electronic device 10, here a terminal (for example a smartphone), employs a microprocessor-based architecture. The electronic device could instead be a video decoder (also known as a set-top box) or a connected electronic device (such as a bracelet, a watch, goggles or a step counter).

The electronic device 10 includes a processor 2, for example a system on chip (SoC) microprocessor. In addition to the processor 2, such a system includes other electronic components having various functions, for example a read only memory or ROM (not shown), a random access memory or RAM 4, and a reprogrammable non-volatile memory 6, for example an electrically erasable and programmable read only memory (EEPROM).

FIG. 2 represents diagrammatically the use of two execution environments in the electronic device 10.

To this end, the processor 2 of the electronic device 10 can execute two distinct operating systems: a rich operating system (Rich OS) 20 and a trusted operating system (Trusted OS) 30, sometimes referred to as a secure operating system (Secure OS).

The rich operating system 20 enables downloading, installation and execution of applications with great freedom for the user. Use of the rich operating system 20 therefore creates a rich execution environment (REE).

On the other hand, in the context of the electronic device 10 functioning using the trusted operating system 30, the options for downloading and installing applications are limited (for example to applications that bear a particular certification) so that using the trusted operating system can create in the electronic device 10 a trusted execution environment (TEE).

This trusted execution environment offers for example a level of security conforming to the EAL (Evaluation Assurance Level) common criteria, corresponding to the ISO 15408 standard, with a level between 2 and 7, or the FIPS (Federal Information Processing Standard) 140-2.

The electronic device 10 also uses a secure monitor 40 that can be executed by the processor 2 of the electronic device 10. The secure monitor 40 controls switching between functioning of the electronic device 10 using the rich operating system 20 and functioning of the electronic device 10 using the trusted operating system 30, so that the electronic device 10 functions at all times using only one of the two operating systems 20, 30 (i.e. in only one of the two environments referred to above). The functioning of the secure monitor 40 conforms to the same security requirements as the trusted operating system 30 and the secure monitor 40 is therefore generally considered to be part of the trusted execution environment TEE, as shown in FIG. 2.

In accordance with one feasible embodiment, the operating system executed before switching over (for example the rich operating system 20) is put on standby upon switching over and all access to elements external to the processor (for example the human-machine interface notably including a keypad and/or a screen and/or another input-output module) is then inhibited for the operating system that is on standby, so that the operating system activated by switching over (here the trusted operating system 30) controls completely the external element, here the human-machine interface.

The secure monitor 40 can also make it possible, upon switching over, to pass information from the operating system that was being executed before switching over to the operating system that is executed after switching over, as shown in the example of a method of loading files into random access memory described hereinafter.

In the example described here, the rich operating system 20 and the trusted operating system 30 are executed by the processor 2 of the electronic device 10. An electronic device could instead be used including two processors, the rich operating system 20 being executed on one and the trusted operating system 30 being executed on the other.

FIG. 3 represents the division of the random access memory 4 into three areas Z1, Z2, Z3 used in the context of the present invention.

A first area Z1 of the random access memory 4 is accessible in read mode and in write mode only by the trusted operating system 30. The rich operating system 20, and therefore the applications executed in the rich execution environment REE, do not have access to the first area Z1.

For example, the first area Z1 is accessible by the trusted operating system 30 using addresses within a first range P1 of addresses, here addresses of which the more significant byte is between h00 and h0F (the notation hxy meaning that the number xy is expressed in hexadecimal notation). These addresses correspond for example to physical addresses in the random access memory 4.

A second area Z2 of the random access memory 4 is a shared area used both by the trusted operating system 30 and by the rich operating system 20. To be precise, the second area Z2 is accessible in read mode and in write mode by the trusted operating system 30; on the other hand, the second area Z2 is accessible in read only mode by the rich operating system 20. The rich operating system 20, and therefore likewise the applications executed in the rich execution environment REE, can therefore not write in the second area Z2.

For example, the second area Z2 is accessible by the trusted operating system 30 using addresses in a second range P2 of addresses, here addresses of which the more significant byte is between h10 and h1F. These addresses correspond for example to physical addresses in the random access memory 4. On the other hand, the second area Z2 is accessible (in read only mode) from the rich operating system 20 using addresses in a third range P3 of addresses distinct from the second range P2 of addresses, here addresses of which the more significant byte is between h20 and h2F.

A third area Z3 of the random access memory 4 is provided for the use of the rich operating system 20 (and the applications executed in the rich execution environment REE). This third area Z3 is therefore accessible in read mode and in write mode by the rich operating system 20 and, via the latter, the applications executed in the rich execution environment REE.

Although use of the third area Z3 by the trusted operating system 30 is not a feature of normal functioning, the trusted operating system 30 may be given the possibility of accessing the third area Z3 in read mode and/or in write mode. The restrictions imposed on applications executed in the trusted execution environment TEE (for example in terms of certification) in fact make it possible to guarantee that access to the third area Z3 from the trusted executed environment TEE will be limited to exceptional circumstances, for example if all of the random access memory 4 must be reset for security reasons. For example, the trusted operating system 30 can therefore read data linked to the user (name, interface information, etc.) in the third area Z3. For its part, writing data in the third area Z3 would be limited to specific circumstances (for example to particular commands and/or particular states of the trusted operating system 30).

For example, the third area Z3 is accessible by the rich operating system 20 using addresses in a fourth range P4 of addresses distinct from the third range P4 of addresses; the fourth range P4 of addresses corresponds here to addresses of which the more significant byte is between h00 and h1F. If the third area Z3 is accessible from the trusted operating system 30, access may be effected by means of addresses in a fifth range P5 of addresses distinct from the first and second ranges P1, P2 of addresses, here addresses of which the more significant byte is between h20 and h3F. These latter addresses correspond for example to physical addresses in the random access memory 4.

Note that the second and third areas Z2, Z3 are accessible by the rich operating system 20 (and therefore for applications executed in the rich execution environment REE) at (virtual) addresses distinct from the physical addresses in the random access memory 4, for example through the use of an alias, which makes it possible to partition the random access memory 4 into the different areas Z1, Z2, Z3 and to prevent any access in the first area Z1 by applications executed in the rich execution environment REE, at the same time as allowing such applications to access the second area Z2 in read only mode.

FIG. 4a represents functional tables stored in the electronic device 10, for example in the reprogrammable non-volatile memory 6.

A first table T1 stores for each application APPL1, APPL2, APPL3 installed in the rich execution environment REE data representative of the frequency of use of the application concerned. This data representative of the frequency of use is for example the number of uses of the application over a given period, here a period of one week. The number of uses over a time lapse of variable duration could be counted instead, defined for example by means of a criterion distinct from the time criterion, such as a criterion linked to a cycle of charging or discharging a battery with which the electronic device is equipped.

The various applications APPL1, APPL2, APPL3 installed may also be classified by decreasing frequency of use, for example in the first table T1 as shown in FIG. 4a.

Multidimensional tables (for example three-dimensional tables as shown in FIG. 4b) could be used instead to store use statistics in accordance with multiple criteria. There is therefore stored for each application APPLi, for example, as shown in FIG. 4b, a use statistic S (for example a frequency of use) as a function of the time T (time of day and day of the week, for example) and the location L.

In this case, the various applications APPLi may be classified by decreasing frequency of use using the statistics relating to the time T in the week corresponding to the current time and to the location L corresponding to the current location.

A second table T2 stores for each application APPL1, APPL2, APPL3 installed in the rich execution environment REE the different resources (or files) used by the application concerned during its execution; these resources are for example function libraries LIB1, LIB2, LIB3 or data sets (or files) DAT1, DAT2, DAT4, DAT6.

The applications installed on the electronic device 10 (for use in the rich execution environment REE where the applications APPL1, APPL2, APPL3 mentioned above are concerned) and the resources that they use (here the functions LIB1, LIB2, LIB3 and the data DAT1, DAT2, DAT4, DAT6) are stored in reprogrammable non-volatile memory 6 (for example after downloading them from a remote computer, such as a service provider server, using telecommunication means of the electronic device 10 that are not shown).

The applications that must be executed by the processor 2 (as well as possibly at least some of the resources that the application can use) are nevertheless loaded into random access memory 4, either after selection of the application by the user or beforehand, as explained hereinafter, in order to speed up launching the application.

FIG. 5 represents an example of a method of loading files into random access memory 4 on starting the electronic device 10.

This method begins with a step E0 of initializing the electronic device 10 after it starts up (for example when it is powered up by the user). After this initialization step E0, all the bytes of the random access memory 4 generally have a predetermined value (for example h00 or hFF) because of the physical design of the random access memory 4 or a forced reinitialization sub-step included in the initialization step E0.

The initialization step E0 includes other sub-steps needed to initialize the functioning of the electronic device 10, for example loading the trusted operating system 30 from the reprogrammable non-volatile memory 6 into the random access memory 4 and starting its execution.

The initialization step E0 is followed by a step E2 during which the trusted operating system 30 commands loading into the first area Z1 of the random access memory 4 of files (applications and resources used by them, notably libraries and data) used in the context of the trusted execution environment TEE. In the embodiment described here, the files are loaded (i.e. copied) into the first area Z1 from the reprogrammable non-volatile memory 6 (where they were stored previously, as already indicated).

Correct storage of the files in the first area Z1 can be verified by the trusted operating system 30, for example by waiting for a correct functioning indicator coming from the random access memory 4 (possibly accompanied by a checksum for the data written into memory) and/or reading the data written to compare it with the data to be written.

The applications loaded into the first area Z1 during the step E2 are for example applications that use basic functionalities (such as those relating to the secure functioning of the electronic device 10) or applications that are frequently used when the electronic device 10 functions in the context of the trusted execution environment TEE.

The method continues with the step E4 in which the trusted operating system 30 sends a request REQ to the rich operating system 20 in order to obtain a list of requirements and hands over to the rich operating system 20. As already indicated, the transmission of information (here the request REQ) and the switching over from the trusted operating system 30 to the rich operating system 20 are carried out by means of the secure monitor 40, for example.

The rich operating system 20 is therefore executed by the processor 2 in the step E6 (for example after being loaded into random access memory 4 by the secure monitor 40) and receives the request REQ sent by the trusted operating system 30 in the step E4.

In the step E7 the rich operating system 20 then prepares the list L1 of requirements that has been requested, which as explained hereinafter indicates the files (applications and resources used by those applications, notably libraries and data) use of which in the context of the rich execution environment REE is foreseeable.

To this end, the rich operating system 20 consults the first table T1, for example, in order to determine the application used most frequently (i.e. here the application APPL2), and then consults the second table T2 in order to determine the resources used by that application (here the libraries LIB1, LIB3 and the data file DAT1).

References to the files determined in this way (namely the application APPL2 used most frequently and the resources LIB1, LIB3, DAT1 used by that application) are then added to the list L1 of requirements.

This process can optionally be repeated for other applications, for example in decreasing order of frequency of use, until the memory size corresponding to the files listed in the list L1 of requirements reaches a predefined threshold (for example equal to the size of the second area Z2 of random access memory 4) or, alternatively, for all the applications installed for use in the rich execution environment REE.

In FIG. 6, a reference to the application APPL3 and to the resources LIB2, DAT2 has therefore been added to the list L1 of requirements. (Note that a reference to a file already mentioned in the list L1 of requirements, here the library LIB3, is not added again to the list L1 of requirements.)

If no use statistic is available (for example the first time the electronic device 10 is used), the rich operating system 20 uses as the list L1 of requirements a default list, for example (stored for this purpose in reprogrammable non-volatile memory 6).

The rich operating system 20 sends the list L1 of requirements to the trusted operating system 30 in the step E8. As already indicated hereinabove, here this transfer of information is managed by the secure monitor 40 and is accompanied by switching the functioning of the electronic device over from the rich execution environment REE to the trusted execution environment TEE.

Execution of the trusted operating system 30 therefore resumes in the step E10, with the reception of the list L1 of requirements.

Then, in the step E11, the trusted operating system 30 determines for each file referred to in the list L1 of requirements if that file is compatible with loading in the shared memory area (or second area) Z2 by verifying that the file conforms to certain criteria, here at least one of the following criteria:
  the file can be used in the trusted execution environment TEE (which is the case if the file is certified and/or has been installed—i.e. loaded into reprogrammable non-volatile memory 6—by the trusted operating system 30);
  use of this (same) file on the one hand during functioning in the trusted execution environment TEE and on the other hand during functioning in the rich execution environment REE is allowed (some files may be specified as reserved for use in the trusted execution environment TEE and therefore prohibited from use in the rich execution environment REE, for example files requiring a high level of security).

For example, the trusted operating system 30 in practice determines if a file is compatible with loading in the shared memory area Z2 by means of a flag (or binary indication) contained in a dedicated location of the file concerned, such as the flags provided in the rights systems used by some operating systems.

In the example described here with reference to FIG. 6, the application APPL2 is an application installed during functioning of the electronic device 10 in the rich execution environment REE, without certification, and the library LIB2 is a library of cryptographic functions (for example encryption, decryption and/or electronic signature) that is not required to be used sometimes in the context of the trusted execution environment TEE and sometimes in the context of the rich execution environment REE. Such a library necessitating a high level of security is generally certified and using it generally involves checking its integrity.

In this example, the trusted operating system 30 therefore determines in the step E11 that the following files may be loaded into the second area Z2 of random access memory 4: LIB1, LIB3, DAT1, APPL3, DAT2.

In the step E12 the trusted operating system 30 computes a global checksum relating to these files to be loaded into the second area Z2.

The trusted operating system 30 can then proceed in the step E13 to loading into the second area Z2 the files determined in the step E11 (here the files LIB1, LIB3, DAT1, APPL3, DAT2). Here these files are loaded from the reprogrammable non-volatile memory 6 (i.e. copied from the reprogrammable non-volatile memory 6 to the second area Z2 of the random access memory 4 under the control of the trusted operating system 30).

Correct storage of the files in the second area Z2 can be verified by the trusted operating system 30, for example by waiting for an indicator of correct functioning coming from the random access memory 4 (possibly accompanied by a verification of the checksum for the data written into memory, computed as indicated above in the step E12) and/or reading the data written to compare it with the data to be written. Alternatively, instead of using a global checksum relating to all of the files to be loaded as proposed above, a checksum may be used for each file to be loaded.

Moreover, the trusted operating system 30 may free up memory spaces in the first area Z1 that were loaded in the step E2 with files of which a copy has been loaded into the second area Z2 in the step E13. During functioning in the trusted execution environment TEE, these files could in fact be consulted or executed by reading them in the second area Z2 and there is therefore no point in retaining a copy of them in the first area Z1.

In the step E14 the trusted operating system 30 then proceeds to generate a sharing list L2 that contains for each file loaded into the second area Z2, for example, as shown in FIG. 6:
  a designation DES of the file concerned;
  the address (here the virtual address) ADR at which the file concerned is stored, as can be used by the rich operating system 20 to access the file (i.e. an address in the third range P3 of addresses);
  information INT regarding verification of the integrity of the file concerned, for example in the form of a cyclic redundancy check (CRC) code;
  a certificate CERT generated for the file concerned by the trusted operating system 30 (in order to enable the rich operating system 20 to verify afterwards that it was indeed the trusted operating system 30 that instigated loading of the file concerned into the second area Z2).

In the example described here, the verification information INT is obtained as indicated above by application of a cyclic redundancy check algorithm to the memory ranges in which the file concerned is stored. One of the following algorithms is used, for example: secure hash algorithm SHA-2, SHA-3 or message digest 5 (MD5). Alternatively, a checksum or a message authentication code (MAC) could be used.

The sharing list L2 may further contain for each file loaded into the second area Z2 the physical address at which the file is stored in the random access memory 4.

In the step E16 the trusted operating system 30 sends the sharing list L2 generated in this way to the rich operating system 20. As before, this sending is effected here via the secure monitor 40 with switching over into the rich execution environment REE.

Alternatively, the sharing list L2 could be stored by the trusted operating system 30 at a predefined memory location accessible by the rich operating system 20, for example at a predefined location in the second area Z2 of random access memory 4.

In order to verify that the sharing list L2 has not been corrupted when it was used, a cyclic redundancy check (CRC) code generated by the trusted operating system 30 and associated with the sharing list L2 may be stored.

Because of the switching over initiated in the step E16, the rich operating system 20 is executed again in the step E18 and stores the received sharing list L2 (or accesses the sharing list L2 at the predefined location in the variant just referred to), possibly with verification of the cyclic redundancy check code associated with the sharing list L2.

During subsequent functioning of the electronic device 10, the rich operating system 20 and the applications executed in the context of the rich execution environment REE can therefore consult the sharing table L2 and access the files stored in the second area Z2 at the address ADR indicated in the sharing table L2 for the file concerned, possibly verifying the integrity of the file using the information INT present in the sharing table L2 for the file concerned and/or the source of the file thanks to the certificate CERT present in the sharing table L2 for the file concerned.

On the basis of the sharing list L2 received (or that can be consulted at the predefined location) and the list L1 of requirements prepared in the step E7, the polyvalent operating system 20 determines (by establishing the difference) in the step E20 which files referred to in the list L1 of requirements have not been loaded into the second area Z2 (the files loaded into the second area Z2 being designated in the sharing list L2).

The files determined in the step E20 as being present in the list L1 of requirements and absent from the sharing list L2 are then loaded into the third area Z3 in the step E22, i.e. copied from the reprogrammable non-volatile memory 6 (where they were installed beforehand) to the third area Z3 of the random access memory 4 under the control of the rich operating system 20.

Moreover, correct storage of the files in the third area Z3 can be verified by the rich operating system 20, for example by waiting for an indicator of correct functioning coming from the random access memory 4 (possibly accompanied by a checksum for the data written into memory) and/or reading the data written to compare it with the data to be written.

This completes the loading of the files into the various areas Z1, Z2, Z3 of the random access memory 4 and normal functioning can therefore begin in the step E24, for example by waiting for a command from the user at the level of the human-machine interface (not shown) of the electronic device 10.

Normal functioning continues until a new application is installed in the context of functioning in the rich execution environment REE.

The rich operating system 20 then prepares an updated list L1' of requirements and sends this list of requirements to the trusted operating system 30 in the step E26.

The trusted operating system 30 receives the updated list L1' of requirements and (as in the step E10) determines the new files to be loaded into the second area Z2, and possibly the files to be deleted from the second area Z2 in order to free up memory space for the new files. This uses, for example a FIFO (first in, first out), LRU (least recently used), LFU (least frequently used) or random priority memory page management method.

The trusted operating system 30 then computes a cyclic redundancy check code relating to the new files to be loaded into the second area Z2 and commands writing of the new files into the second area Z2 (step E30).

Then, in the step E32, the trusted operating system 30 updates the sharing list L2 (to take account of the new files loaded into the second area Z2). The method then continues with the step E16 described below for switching over to the rich execution environment REE with sending of the (updated) sharing list and loading into the area Z3 of the files necessary for the new application to function that have not been loaded into the area Z2.

As an alternative to the steps E26 to E32 that have just been described, the method could loop to the step E4 on installation of a new application in the rich execution environment REE in order to carry out in its entirety the method of loading files into the area Z2 in the steps E4 to E16 as described above.

The invention claimed is:

1. A method of loading files into random access memory in an electronic device designed to function in a trusted execution environment, because of the execution of a trusted operating system by a processor of the electronic device, or in a rich execution environment, said method comprising:
   initializing the functioning of the electronic device by loading the trusted operating system and starting the execution of the trusted operating system;
   switching between functioning in the trusted execution environment to functioning in the rich execution environment, the electronic device remaining functioning at all times;
   preparing a description of requirements containing an information identifying at least one application file, during functioning of the electronic device in the rich execution environment;
   switching between functioning in the rich execution environment, to functioning in the trusted execution environment, the electronic device remaining functioning at all times;
      receiving, by the trusted operating system, said description of requirements;
      verifying, by the trusted operating system, the conformance of the identified application file to at least one given criterion; and
      in the event of conformance, loading the identified application file into an area of random access memory accessible in read only mode when functioning in the rich execution environment.

2. The loading method according to claim 1, wherein the description of requirements is constructed as a function of data representative of frequencies of use of applications installed in the rich execution environment.

3. The loading method according to claim 1, wherein the description of requirements is constructed as a function of use statistics relating to multiple criteria.

4. The loading method according to claim 1, including the following steps, executed in the rich execution environment for each file mentioned in the description of requirements:
   determining if the application file has been loaded into said area of random access memory accessible in read only mode;
   if not, loading the application file into another area of random access memory accessible in write mode during functioning in the rich execution environment.

5. The loading method according to claim 1, including a step of construction by the trusted operating system of a sharing list including a designation of the loaded application file and a storage address of the loaded application file.

6. The loading method according to claim 5, wherein the sharing list includes integrity verification information associated with the loaded application file.

7. The loading method according to claim 5, wherein the sharing list includes a certificate (CERT) generated by the trusted operating system and relating to the loaded application file.

8. The loading method according to claim 5, wherein the sharing list is stored in said area of random access memory accessible in read only mode during functioning in the rich execution environment.

9. The loading method according to claim 1, wherein said loading is effected from a non-volatile memory.

10. The loading method according to claim 1, wherein said area is accessible in read only mode during functioning in the rich execution environment by means of virtual addresses pointing to physical addresses distinct from the virtual addresses concerned.

11. The loading method according to claim 1, wherein the information identifying the description of requirements is received on switching over from the rich execution environment to the trusted execution environment.

12. A method of loading files into random access memory in an electronic device designed to function in a trusted execution environment, because of the execution of a trusted operating system by a processor of the electronic device, or in a rich execution environment, said method comprising:
   receiving, by the trusted operating system, information identifying at least one file;
   verifying, by the trusted operating system, the conformance of the identified file to at least one given criterion;
   in the event of conformance, loading the identified file into an area of random access memory accessible in read only mode when functioning in the rich execution environment;
      following installation of a new application in the rich execution environment, transmitting, to the trusted operating system, an updated description of requirements; and
      loading, into the area of random access memory accessible in read only mode during functioning in the rich execution environment, a new file designated in the updated description of requirements.

13. An electronic device, comprising at least one processor and a random access memory, and designed to function in a trusted execution environment because of the execution of a trusted operating system by the processor or in a rich execution environment,
   wherein the electronic device is designed to:
   initialize its functioning by loading the trusted operating system and starting the execution of the trusted operating;
   switch between functioning in the trusted execution environment to functioning in the rich execution environment, the electronic device remaining functioning at all times;
   prepare a description of requirements containing an information identifying at least one application file, during functioning in the rich execution environment; and
   switch between functioning in the rich execution environment, to functioning in the trusted execution environment, the electronic device remaining functioning at all times,
   the trusted operating system being designed to receive the description of requirements, to verify the conformance of the identified application file with at least one given criterion and, in the event of conformance, to load the identified application file into an area of the random access memory accessible in read only mode during functioning in the rich execution environment.

* * * * *